US010721296B2

(12) United States Patent
Rozenbaum et al.

(10) Patent No.: US 10,721,296 B2
(45) Date of Patent: Jul. 21, 2020

(54) OPTIMIZED ROLLING RESTART OF STATEFUL SERVICES TO MINIMIZE DISRUPTION

(71) Applicant: International Business Machines Corporation, Armonk, NY (US)

(72) Inventors: Nir Rozenbaum, Kiryat Bialik (IL); Bruno Wassermann, Raanana (IL)

(73) Assignee: International Business Machines Corporation, Armonk, NY (US)

(*) Notice: Subject to any disclaimer, the term of this patent is extended or adjusted under 35 U.S.C. 154(b) by 241 days.

(21) Appl. No.: 15/830,013

(22) Filed: Dec. 4, 2017

(65) Prior Publication Data

US 2019/0173943 A1    Jun. 6, 2019

(51) Int. Cl.
*H04L 29/08* (2006.01)
*H04L 12/24* (2006.01)

(52) U.S. Cl.
CPC ...... *H04L 67/1034* (2013.01); *H04L 41/0672* (2013.01); *H04L 41/082* (2013.01); *H04L 41/30* (2013.01); *H04L 67/101* (2013.01); *H04L 67/1031* (2013.01); *H04L 67/1097* (2013.01); *H04L 67/16* (2013.01)

(58) Field of Classification Search
CPC . H04L 67/1034; H04L 41/30; H04L 41/0672; H04L 67/101; H04L 67/1097; H04L 67/1031; H04L 67/16
See application file for complete search history.

(56) References Cited

U.S. PATENT DOCUMENTS

| | | | |
|---|---|---|---|
| 9,229,707 B2 | 1/2016 | Borissov et al. | |
| 9,575,738 B1* | 2/2017 | Chopra | ............ G06F 8/60 |
| 9,647,901 B2 | 5/2017 | Newton et al. | |
| 2004/0210888 A1* | 10/2004 | Bergen | ............ G06F 9/461 717/168 |
| 2005/0004847 A1* | 1/2005 | Matsuura | ............ G06Q 30/06 705/26.81 |
| 2007/0174661 A1* | 7/2007 | Peddada | ............ G06F 11/2025 714/4.4 |
| 2013/0242717 A1* | 9/2013 | Fujii | ............ H04L 45/507 370/216 |

(Continued)

OTHER PUBLICATIONS

Gramoli et al., "Rollup: Non-Disruptive Rolling Upgrade with Fast Consensus-Based Dynamic Reconfigurations", IEEE Transactions on Parallel and Distributed Systems, Sep. 2016, pp. 2711-2724, vol. 27, Issue 9.

*Primary Examiner* — Oanh Duong
(74) *Attorney, Agent, or Firm* — Kirsch, Gregory (57) ABSTRACT

Embodiments of the present systems and methods may provide the capability to reduce service unavailability, client disruption, network traffic and processing load due to state synchronization. For example, a computer-implemented method for controlling operation of a plurality of server computer systems may comprise determining an order in which the plurality of server computer systems is to be restarted and restarting each of the plurality of server computer systems sequentially according to the determined order, wherein a leader of the server computer systems receives and handles write requests for the plurality of server computer systems, and wherein the leader server computer system is restarted last.

15 Claims, 3 Drawing Sheets

(56) References Cited

U.S. PATENT DOCUMENTS

| | | | |
|---|---|---|---|
| 2014/0304366 A1* | 10/2014 | Fletcher | H04L 65/1066 |
| | | | 709/217 |
| 2014/0376362 A1* | 12/2014 | Selvaraj | H04L 41/082 |
| | | | 370/221 |
| 2015/0149524 A1* | 5/2015 | Nishikawa | G06F 11/00 |
| | | | 709/201 |
| 2016/0070624 A1* | 3/2016 | Prasad | G06F 3/0619 |
| | | | 714/19 |
| 2016/0164722 A1 | 6/2016 | Zhu et al. | |
| 2016/0231998 A1 | 8/2016 | Islam et al. | |
| 2017/0019485 A1* | 1/2017 | Dorr | H04L 67/142 |
| 2017/0024293 A1* | 1/2017 | Bell | G06F 11/1438 |
| 2017/0168756 A1* | 6/2017 | Yamada | G06F 12/00 |
| 2018/0067736 A1* | 3/2018 | De Zaeytijd | G06F 8/65 |
| 2018/0121304 A1* | 5/2018 | Liaw | G06F 11/2094 |

\* cited by examiner

OPTIMIZED ROLLING RESTART OF STATEFUL SERVICES TO MINIMIZE DISRUPTION

BACKGROUND

The present invention relates to techniques for performing lifecycle operations on a stateful clustered service in a manner that reduces downtime of the service and disruption to clients.

Stateful clustered services that provide strong consistency guarantees over the data stored with them, such as state machine replication systems (for example, APACHE ZOO-KEEPER™), generally represent a critical service or dependency for their clients. Clients cannot necessarily proceed safely without the stateful clustered service being available. For example, many services require a majority quorum in order to be able to continue to provide service. That is, as long as (n+1)/2 servers are operational, the overall stateful service remains available to clients.

When performing lifecycle operations on a stateful clustered service, such as upgrading the installation or migrating a server, it is important to do so in a manner that reduces downtime of the service and disruption to clients. Therefore, lifecycle operations are conventionally performed in a serial manner, in which one member of the stateful cluster is made unavailable to clients in order to perform the lifecycle operation on that member, while the remaining servers, or at least a majority of servers, remain operational and continue to provide service. Once the lifecycle operation is complete, the server is brought back online and after its successful reintegration into the cluster, the operation lifecycle proceeds with the next server and so on until the operation has been applied to all servers in the cluster. This may be referred to as a rolling restart.

While this approach affords the continued availability of the service, there are a number of problems with existing approaches to rolling restarts of stateful clustered services. First, such systems typically have the notion of a distinguished server that serves as the leader or primary node and is responsible for handling all write requests. If the leader process is taken down, a recovery protocol to elect a new leader needs to be instantiated by the remaining members of the cluster. During that time, the entire service is unavailable to clients. Each time this protocol is executed, there is the risk of leader election taking longer, for example, due to network or other issues, and exceeding session timeouts that the clients may have, which in turn can violate session guarantees. Second, for each server that is taken down for a lifecycle operation, its clients become disconnected and need to reconnect to another member of the group, which causes some delays to clients and shuffles load around the remaining servers in the cluster. Third, in case of migration, such as replacing a server with a new server or replacing a storage device, the member that comes back up needs to synchronize with one of the majority quorum in order transfer the state in its entirety. This causes network traffic and again load on the cluster.

A need arises for techniques to reduce service unavailability, client disruption, network traffic and processing load due to state synchronization.

SUMMARY

Embodiments of the present systems and methods may provide the capability to reduce service unavailability, client disruption, network traffic and processing load due to state synchronization.

In embodiments, the present techniques may be based on a protocol that improves the rolling upgrade/restart in a manner that minimizes the impact of the identified issues. More specifically, at each stage of the rolling restart procedure the protocol may select the next step of the process in a way that (1) improves the availability of the clustered service by minimizing the number of leader elections caused by a sequence of restarts; (2) reduces the number of necessary client disconnections and reconnections; and (3) reduces network traffic and load on the cluster incurred from upgraded/migrated members that need to synchronize with the latest state. In embodiments, the priority of reduction of these issues may vary. For example, issue (1) may get higher priority, as during leader elections the service is not available, while in issues (2) and (3) the service is available.

For example, in an embodiment, a computer-implemented method for controlling operation of a plurality of server computer systems may comprise determining an order in which the plurality of server computer systems is to be restarted and restarting each of the plurality of server computer systems sequentially according to the determined order, wherein a leader of the server computer systems receives and handles write requests for the plurality of server computer systems, and wherein the leader server computer system is restarted last.

In embodiments, the plurality of server computer systems may comprise a stateful clustered computing service. The order in which the plurality of server computer systems is to be restarted may be determined by sorting the plurality of server computer systems, except for the leader server computer system, based on the number of client computer systems connected to each of the plurality of server computer systems, in ascending order. The method may further comprise accepting new connections with client computer systems at each server computer system that has been restarted and not accepting new connections with client computer systems at each server computer system that has not been restarted yet. Restarting each of the plurality of server computer systems may comprise stopping processing on the server computer system being restarted, backing up a state of the server computer system being restarted, performing maintenance on the server computer system being restarted, restoring the backed-up processing state of the server computer system being restarted and restarting processing on the server computer system being restarted. The maintenance may comprise at least one of an update, replacement, or modification to the server computer system.

In an embodiment, a system for controlling operation of a plurality of server computer systems may comprise a processor, memory accessible by the processor, and computer program instructions stored in the memory and executable by the processor to perform determining an order in which the plurality of server computer systems is to be restarted and restarting each of the plurality of server computer systems sequentially according to the determined order, wherein a leader of the server computer systems receives and handles write requests for the plurality of server computer systems, and wherein the leader server computer system is restarted last.

In an embodiment, a computer program product for controlling operation of a plurality of server computer systems may comprise a non-transitory computer readable storage having program instructions embodied therewith, the program instructions executable by a computer, to cause the computer to perform a method comprising determining an order in which the plurality of server computer systems is to be restarted and restarting each of the plurality of server computer systems sequentially according to the determined order, wherein a leader of the server computer systems receives and handles write requests for the plurality of server computer systems, and wherein the leader server computer system is restarted last.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide the capability to reduce service unavailability, client disruption, network traffic and processing load due to state synchronization.

In embodiments, the present techniques may be based on a process that improves the rolling upgrade/restart in a manner that minimizes the impact of the identified issues. More specifically, at each stage of the rolling restart procedure the next step of the process may be selected in a way that (1) improves the availability of the clustered service by minimizing the number of leader elections caused by a sequence of restarts; (2) reduces the number of necessary client disconnections and reconnections; and (3) reduces network traffic and load on the cluster incurred from upgraded/migrated members that need to synchronize with the latest state. In embodiments, the priority of reduction of these issues may vary. For example, issue (1) may get higher priority, as during leader elections the service in not available, while in issues (2) and (3) the service is available.

Figure 1:
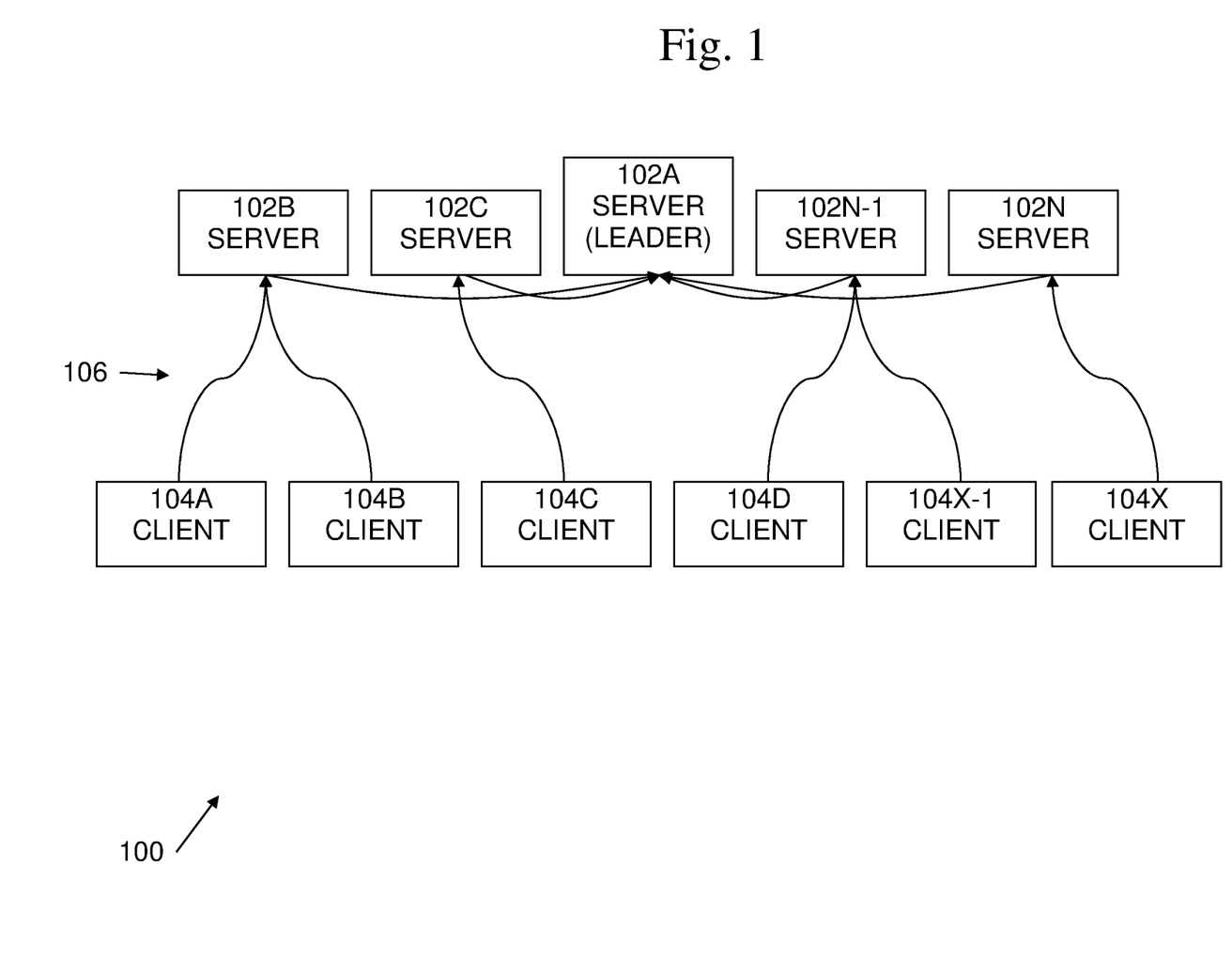
FIG. 1 illustrates an exemplary service cluster in which described embodiments may be implemented.

An example of a service cluster 100 is shown in FIG. 1. Cluster 100 may include a plurality of server systems 102A-N, and a plurality of client systems 104A-X. In this example, one of the server systems 102A is a leader system, while the other server systems are follower systems 102B-N. For example, all write requests 104 from clients 104A-X may be forwarded to a single server, the leader 102A. The leader 102A sends message proposals to the followers 102B-N and agree upon message delivery. The leader 102A may be replaced, for example, upon failure, by one of the other server systems. Typically, cluster 100 provides a stateful service, that is, the servers 102A-N keeps track of the state of interaction among the servers and/or clients, and store this state information in memory. For example, each server may maintain an in-memory image of state, along with a transaction logs and snapshots in a persistent store. In particular, each server 102A-N may store list of connected clients 104A-X that perform operations against the cluster 100. Clients 104A-X may do read operations against all servers 102A-N, while every write operation goes directly from clients 104A-X to the leader 102A or from clients 104A-X to a follower 102B-N which in turn sends it to the leader 102A.

When a leader 102A is to be replaced, an election of a new leader may be held among the remaining servers 102B-N. During the leader election, there is no operational leader; thus, the cluster service is not available. Accordingly, it is desirable to reduce the number of leader elections, since the service is not available during elections. Furthermore, there is a risk of a leader election taking longer than usual due to a variety of issues, which can lead to expiry of client sessions. In this situation, clients may experience disruption and even exhaust the maximum number of retries before being able to reestablish connectivity.

Figure 2:
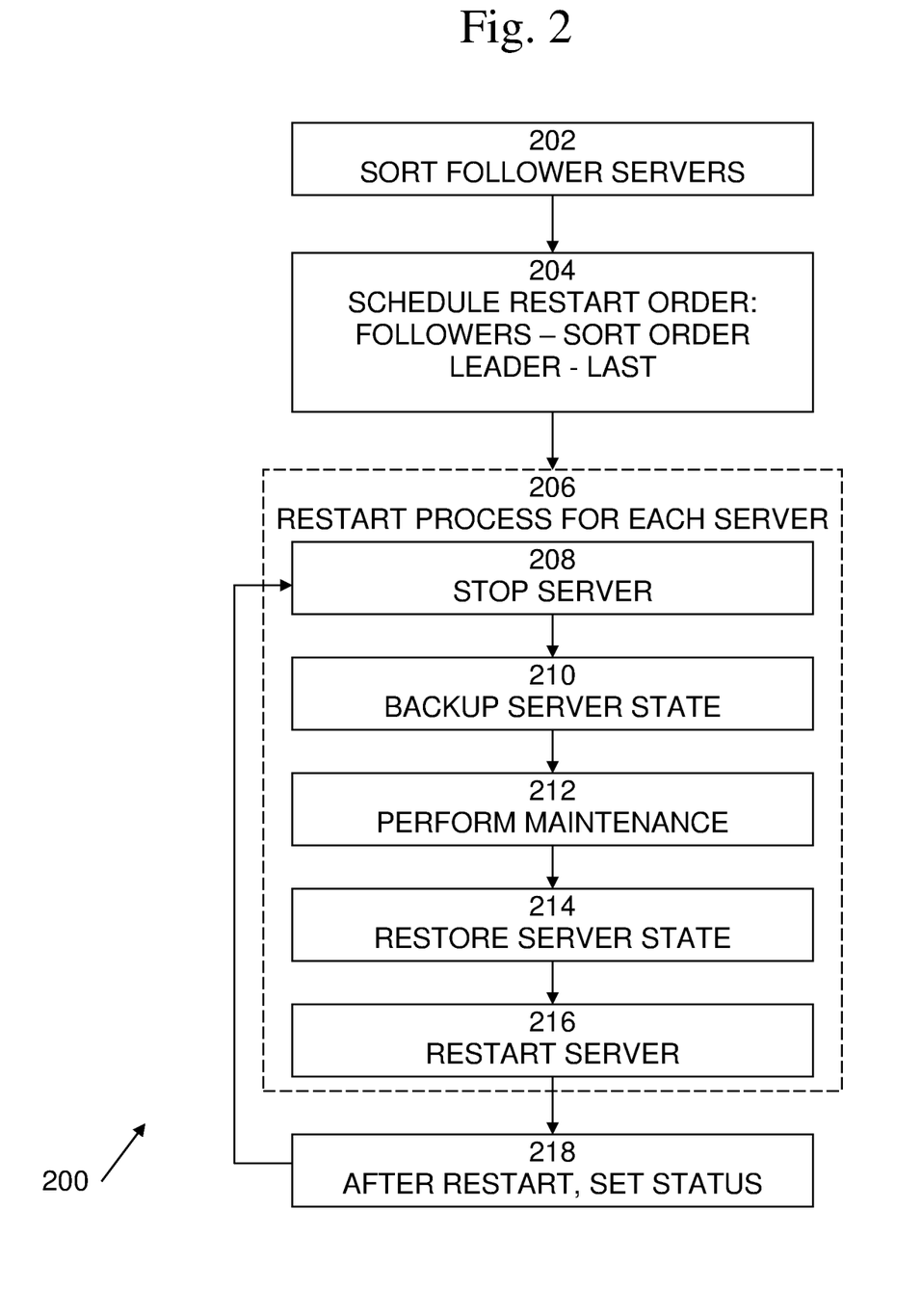
FIG. 2 is an exemplary flow diagram of an embodiment of a rolling upgrade/restart process.

An example of a rolling upgrade/restart process 200 in accordance with the present techniques is shown in FIG. 2. It is best viewed in conjunction with FIG. 1. Process 200 begins with 202, in which all follower servers 102B-N may be sorted by the number of clients 104A-X connected to each follower in, for example, ascending order. At 204, the restart order may be scheduled. For example, followers 102B-N may be scheduled to be restarted according to the sort order, and the current leader 102A may be scheduled to be restarted last.

Each rolling restart may involve at least one leader election. Before a rolling restart is performed, there is a specific server that is the current leader. Since the rolling restart involves a restart to all servers, it will also involve a restart to the current leader. At the point in time where the leader is restarted, the other servers will have to choose a new leader (one of the remaining 'N−1' servers). If the new leader that is chosen has not yet been restarted, another leader election will occur when the new leader is restarted. In order to reduce the number of leader elections, and by this increase the availability of the service, the current leader 102A may be scheduled to be restarted last. This ensures that only a single leader election will be triggered. Accordingly, rolling restart involves at least one leader election, and scheduling the current leader 102A to be restarted last may ensure that the rolling restart will involve at most one leader election, thus minimizing number of leader elections.

At 206, the servers may be restarted, for example, one at a time, according to the scheduled restart order. For example, during a rolling restart, numerous clients may be disconnected from their current servers. For example, when a server is stopped while it still has clients connected to it, all of its clients must move to a different server in the cluster and retry their respective operations.

In particular, the clients that are connected to the first restarted server will be moved to a different server at least twice. When the first server is stopped, its clients will be moved to a different server. For example, looking at a specific client, let us assume that the client moved from the first restarted server to another server 'Y'. Since the restarted server was the first out of all servers, all the other servers are restarted, and eventually server 'Y' is restarted, which will cause the client to move (again) to a different server in the cluster. Each time a client is moved to a different server, if the server to which the client is moved has not yet been restarted, the client will have to be moved again. Accordingly, restarting the servers 102B-N according to the sort order, starting with those servers having the fewest number of clients connected, may provide a reduction in the number of clients that must be moved at least twice.

Further, all clients that are connected to any of the servers will be moved to a different server at least once. For example, looking at a specific client, before the rolling restart process is begun, the client is connected to a server 'Z'. During the rolling restart process, all servers are restarted, and eventually server 'Z' will be restarted, which will cause the client to move to a different server in the cluster. Again, each time a client is moved to a different server, if the server to which the client is moved has not yet been restarted, the client will have to be moved again.

In particular, the number of times clients move from one server to another is at least:

clients_connected+# clients_connected_to_first_restarted_server.

It is desirable to reduce the number of times clients have to move from one server to another, as this causes delays and disruption to the handling of the client requests. In order to do this, process 200 may implement a mechanism to accept new connections with client computer systems at each server that has been restarted and to not accept new connections with client computer systems at each server that has not been restarted. In understanding process 200, a server status may be defined in which the server keeps handling the existing requests but does not accept new requests. This status may be termed a lame duck server state, as contrasted to a regular server state. The described processing of this status may be used to ensure that all clients, except those connected to the first restarted server, are moved only once by ensuring that the clients move to a server that was already restarted and therefore will not have to move again. By sorting the follower servers according to the number of connections, and restarting according to that sort order, the "# clients_connected_to_first_restarted_server" may be minimized.

At 206, the restart process for each server is performed. At the start of process 206, the first server in the sort order, which has the fewest connected clients, is restarted. At 208, server processing on the server currently being restarted is stopped. At 210, the processing state of the server may be backed up. The backup may be performed to an external data storage system, for example, a separate file system, object storage system, etc., which may enhance the availability of the backed up data. For example, if the server being restarted fails to restart, or is replaced, the backed up data may be restored to a different server for resumption of processing. At 212, the maintenance operations may be performed on the server. At 214, the backed up server state may be restored to the server. At 216, the server may be restarted, and processing may resume.

Performing this process may reduce network traffic and startup time for each server after it is restarted. This may ensure that the state of the restarted server will be as close as possible to the current state, which may have advanced during its downtime. The restarted server needs to only learn about the delta that occurred during this time, which is likely to be much smaller than the entire state. In comparison to doing the restart without the backup-restore process, there may be some cases where the state is deleted. For example, if a server is migrated to new hardware, none of the state is available on the new machine. In such cases, the restarted server would otherwise have to synchronize the entire state, which can result in significant network overhead affecting the server selected to synchronize the state from. However, the backup-restore process may reduce the amount of network traffic for such operations, as the data size that will be synchronized may be reduced. In addition, the time it will take for the server to come back online may be reduced, since it has most of the data to start with.

At 210, after the first server to be restarted has been restarted, the status of all servers except the restarted server may be changed to lame duck status, in which no new client may be added to the lame duck server. Then process 200 may loop back to 206, and restarts may be continued according to the scheduled order. As a result, as each server is restarted, its status may be changed back from lame duck status to a regular status, in which it may accept new client connections. In this way, the process may ensure that all clients, except those connected to the first restarted server, are moved only once. That is, the clients move to a server that was already restarted and therefore will not have to move again. For example, when the second server begins the restart process 200, the clients connected to that second server may be moved to the first server to be restarted, as the first server now has regular status. As the first server to be restarted had the fewest connected clients before the restart, it should have adequate capacity to handle the clients moved from the second server to be restarted, which had the second fewest connected clients. As the restart process 200 progresses, the servers being restarted may have more connected clients to be moved, but as the restart process progresses, the number of servers that have regular status also increases, providing more servers among which the clients to be moved may be distributed.

In embodiments, restart process 200 may include notifying clients which server is going to be restarted next. This may provide clients with an early warning about which server is not going to be available in due time, which can save time.

Figure 3:
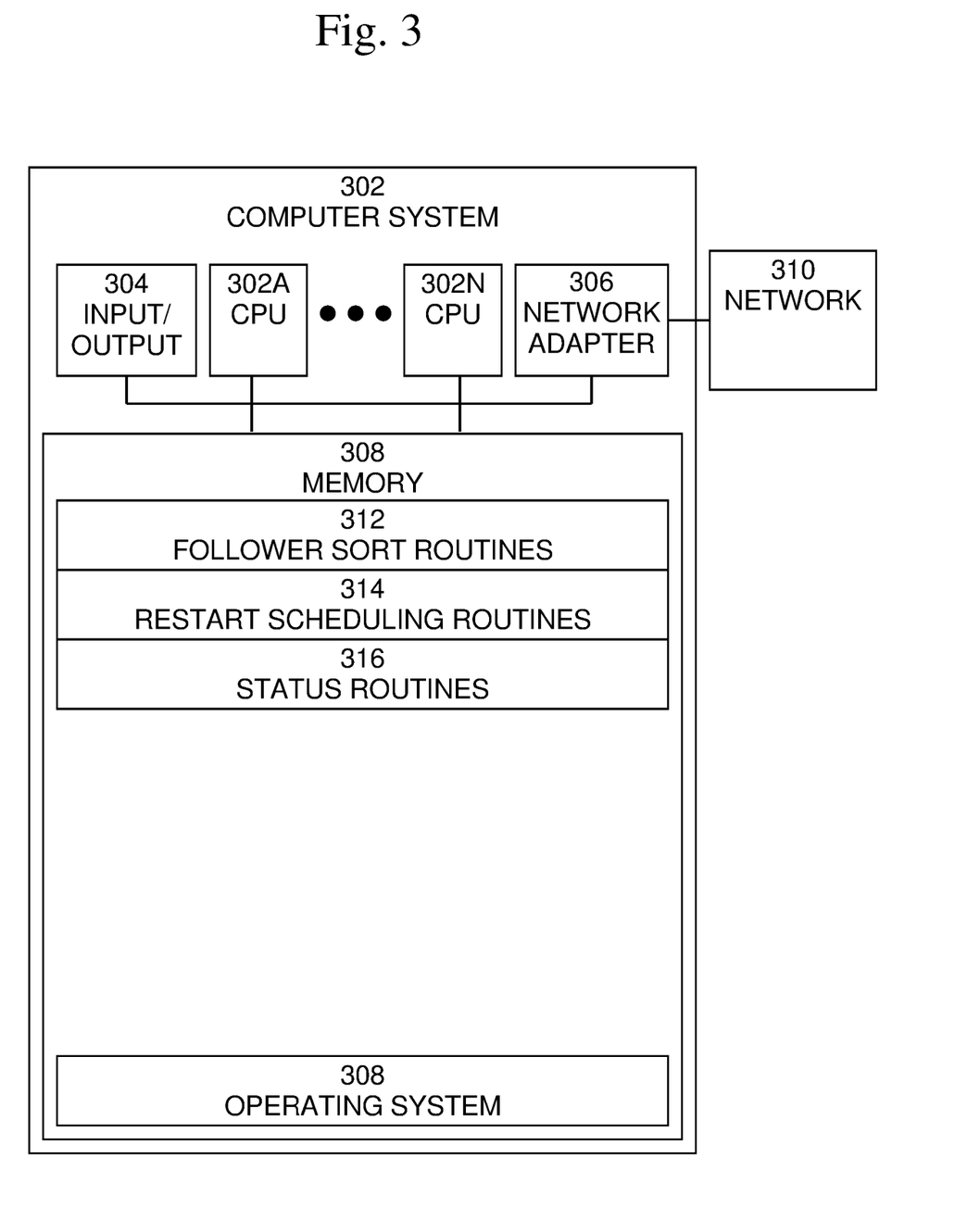
FIG. 3 is an exemplary block diagram of a computer system in which processes involved in the embodiments described herein may be implemented.

An exemplary block diagram of a computer system 302, in which processes involved in the embodiments described herein may be implemented, is shown in FIG. 3. Computer system 302 may be implemented using one or more programmed general-purpose computer systems, such as embedded processors, systems on a chip, personal computers, workstations, server systems, and minicomputers or mainframe computers, or in distributed, networked computing environments. Computer system 302 may include one or more processors (CPUs) 302A-302N, input/output circuitry 304, network adapter 306, and memory 308. CPUs 302A-302N execute program instructions in order to carry out the functions of the present communications systems and methods. Typically, CPUs 302A-302N are one or more microprocessors, such as an INTEL CORE® processor. FIG. 3 illustrates an embodiment in which computer system 302 is implemented as a single multi-processor computer system, in which multiple processors 302A-302N share system resources, such as memory 308, input/output circuitry 304, and network adapter 306. However, the present communications systems and methods also include embodiments in which computer system 302 is implemented as a plurality of networked computer systems, which may be single-processor computer systems, multi-processor computer systems, or a mix thereof.

Input/output circuitry 304 provides the capability to input data to, or output data from, computer system 302. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 306 interfaces device 300 with a network 310. Network 310 may be any public or proprietary LAN or WAN, including, but not limited to the Internet.

Memory 308 stores program instructions that are executed by, and data that are used and processed by, CPU 302 to perform the functions of computer system 302. Memory 308 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 308 may vary depending upon the function that computer system 302 is programmed to perform. In the example shown in FIG. 3, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In embodiments, at least a portion of the software shown in FIG. 3 may be implemented on a current leader server. Likewise, in embodiments, at least a portion of the software shown in FIG. 3 may be implemented on a computer system other than the current leader server.

In the example shown in FIG. 3, memory 308 may include follower sort routines 312, restart scheduling routines 314, status routines 316, and operating system 318. Follower sort routines 312 may sort the follower servers by the number of clients connected to each follower, in for example, ascending order. Restart scheduling routines 314 may schedule server systems for restart and may initiate and control the restart process of each server being restarted. Status routines 316 determine and set the status of each server being restarted, as well as controlling new client connections with servers depending upon their status. Operating system 320 may provide overall system functionality.

As shown in FIG. 3, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method for controlling operation of a plurality of server computer systems comprising:
    determining an order in which the plurality of server computer systems is to be restarted;
    restarting each of the plurality of server computer systems sequentially according to the determined order; and
    accepting new connections with client computer systems only at a server computer system that has been restarted, and handling existing connections and not accepting new connections with client computer systems at each server computer system that has not been restarted;
    wherein a leader of the server computer systems receives and handles write requests for the plurality of server computer systems, and wherein the leader server computer system is restarted last.

2. The method of claim 1, wherein the plurality of server computer systems comprises a stateful clustered computing service.

3. The method of claim 1, wherein the order in which the plurality of server computer systems is to be restarted is determined by sorting the plurality of server computer systems, except for the leader server computer system, based on a number of client computer systems connected to each of the plurality of server computer systems, in ascending order.

4. The method of claim 3, wherein restarting each of the plurality of server computer systems comprises:
    stopping processing on the server computer system being restarted;
    backing up a state of the server computer system being restarted;
    performing maintenance on the server computer system being restarted;
    restoring the backed-up processing state of the server computer system being restarted; and
    restarting processing on the server computer system being restarted.

5. The method of claim 4, wherein the maintenance comprises at least one of an update, replacement, or modification to the server computer system.

6. A system for controlling operation of a plurality of server computer systems, the system comprising a processor, memory accessible by the processor, and computer program instructions stored in the memory and executable by the processor to perform:
    determining an order in which the plurality of server computer systems is to be restarted;
    restarting each of the plurality of server computer systems sequentially according to the determined order; and
    accepting new connections with client computer systems only at a server computer system that has been restarted, and handling existing connections and not accepting new connections with client computer systems at each server computer system that has not been restarted;
    wherein a leader of the server computer systems receives and handles write requests for the plurality of server computer systems, and wherein the leader server computer system is restarted last.

7. The system of claim 6, wherein the plurality of server computer systems comprises a stateful clustered computing service.

8. The system of claim 6, wherein the order in which the plurality of server computer systems is to be restarted is determined by sorting the plurality of server computer systems, except for the leader server computer system, based on a number of client computer systems connected to each of the plurality of server computer systems, in ascending order.

9. The system of claim 8, wherein restarting each of the plurality of server computer systems comprises:
- stopping processing on the server computer system being restarted;
- backing up a state of the server computer system being restarted;
- performing maintenance on the server computer system being restarted;
- restoring the backed-up processing state of the server computer system being restarted; and
- restarting processing on the server computer system being restarted.

10. The system of claim 9, wherein the maintenance comprises at least one of an update, replacement, or modification to the server computer system.

11. A computer program product for controlling operation of a plurality of server computer systems, the computer program product comprising a non-transitory computer readable storage having program instructions embodied therewith, the program instructions executable by a computer, to cause the computer to perform a method comprising:
- determining an order in which the plurality of server computer systems is to be restarted;
- restarting each of the plurality of server computer systems sequentially according to the determined order; and
- accepting new connections with client computer systems only at a server computer system that has been restarted, and handling existing connections and not accepting new connections with client computer systems at each server computer system that has not been restarted;
- wherein a leader of the server computer systems receives and handles write requests for the plurality of server computer systems, and wherein the leader server computer system is restarted last.

12. The computer program product of claim 11, wherein the plurality of server computer systems comprises a stateful clustered computing service.

13. The computer program product of claim 11, wherein the order in which the plurality of server computer systems is to be restarted is determined by sorting the plurality of server computer systems, except for the leader server computer system, based on a number of client computer systems connected to each of the plurality of server computer systems, in ascending order.

14. The computer program product of claim 13, wherein restarting each of the plurality of server computer systems comprises:
- stopping processing on the server computer system being restarted;
- backing up a state of the server computer system being restarted;
- performing maintenance on the server computer system being restarted;
- restoring the backed-up processing state of the server computer system being restarted; and
- restarting processing on the server computer system being restarted.

15. The computer program product of claim 14, wherein the maintenance comprises at least one of an update, replacement, or modification to the server computer system.

* * * * *